United States Patent
Lee et al.

(10) Patent No.: US 10,797,295 B2
(45) Date of Patent: Oct. 6, 2020

(54) SECONDARY BATTERY

(71) Applicant: SAMSUNG SDI CO., LTD., Yongin-si, Gyeonggi-do (KR)

(72) Inventors: Jiho Lee, Yongin-si (KR); Mincheol Bae, Yongin-si (KR); Ikjae Jeong, Yongin-si (KR); Kyounghwan Noh, Yongin-si (KR); Hongkeun Choi, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 949 days.

(21) Appl. No.: 15/079,183

(22) Filed: Mar. 24, 2016

(65) Prior Publication Data
US 2016/0308189 A1  Oct. 20, 2016

(30) Foreign Application Priority Data
Apr. 17, 2015 (KR) .......................... 10-2015-0054402

(51) Int. Cl.
*H01M 2/34* (2006.01)
*H01M 2/06* (2006.01)
*H01M 2/12* (2006.01)

(52) U.S. Cl.
CPC ............ *H01M 2/345* (2013.01); *H01M 2/06* (2013.01); *H01M 2/1229* (2013.01)

(58) Field of Classification Search
CPC ..................................................... H01M 2/345
See application file for complete search history.

(56) References Cited

U.S. PATENT DOCUMENTS

| 2010/0279156 | A1 | 11/2010 | Kim et al. |
| 2011/0039136 | A1* | 2/2011 | Byun ................. H01M 2/0404 429/56 |
| 2013/0004831 | A1 | 1/2013 | Byun et al. |
| 2014/0038001 | A1* | 2/2014 | Cai ....................... H01M 2/043 429/53 |

FOREIGN PATENT DOCUMENTS

| KR | 20-1998-0045752 U | 9/1998 |
| KR | 10-2011-0005197 A | 1/2011 |
| KR | 10-2013-0003148 A | 1/2013 |

* cited by examiner

*Primary Examiner* — Stephan J Essex
(74) *Attorney, Agent, or Firm* — Lee IP Law, P.C.

(57) ABSTRACT

A secondary battery includes an electrode assembly, a case, a cap plate, and a terminal plate. The electrode assembly includes a separator between first and second plates. The case includes the electrode assembly and has an opening. The cap plate seals the opening of the case and has a hole. The terminal plate is on the cap plate and includes a discharge hole aligned with the hole in the cap plate. A short circuit area with a vent may be included in the hole of the cap plate.

9 Claims, 6 Drawing Sheets

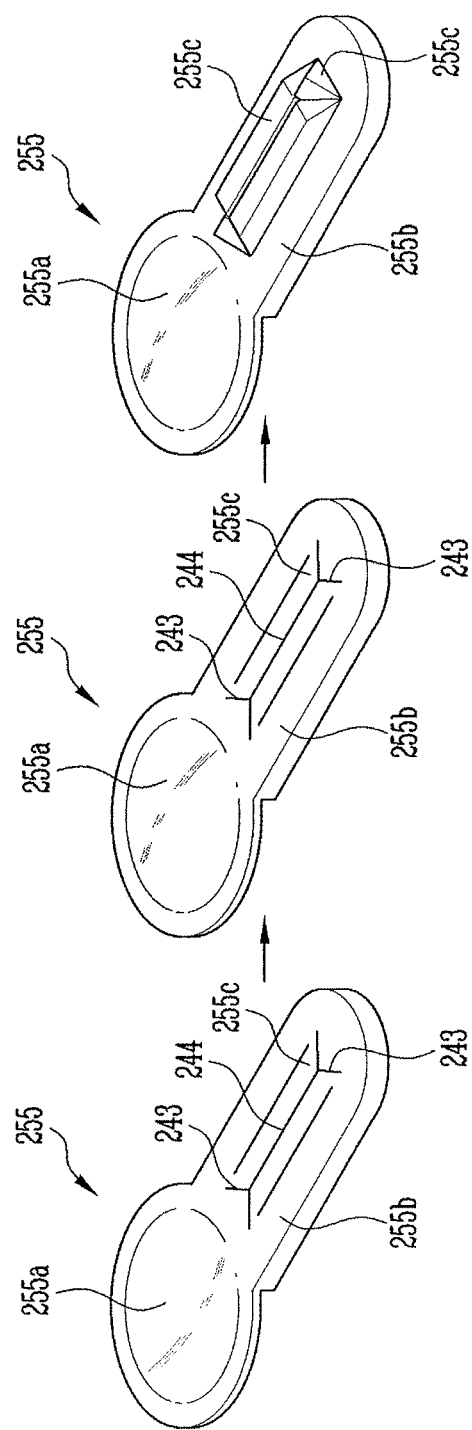

SECONDARY BATTERY

CROSS-REFERENCE TO RELATED APPLICATION

Korean Patent Application No. 10-2015-0054402, filed on Apr. 17, 2015, and entitled: "Secondary Battery," is incorporated by reference herein in its entirety.

BACKGROUND

1. Field

One or more embodiments described herein relate to a secondary battery.

2. Description of the Related Art

A secondary battery can be charged and discharged multiple times. As electrical, electronics, communications, and computer industry applications continue to develop, the demand for secondary batteries has increased. As a result, interest has been generated in improving their manufacturing processes. However, several factors have been shown to be of concern. For example, the materials (e.g., lithium) used to fabricate secondary batteries may have substantial reactivity. Also, secondary batteries are susceptible to short-circuits.

SUMMARY

In accordance with one or more embodiments, a secondary battery includes an electrode an electrode assembly having a separator between first and second plates; a case including the electrode assembly and having an opening; a cap plate sealing the opening of the case and including a hole; and a terminal plate on the cap plate and including a discharge hole aligned with the hole in the cap plate, the hole including a short circuit area with a vent.

The short circuit area may include a second area surrounding and extending from a first area. The first area may be thicker than the second area. The first and second areas may have rounded surfaces and different bend radii. The vent may be in the first area and may include grooves that cross each other. The short circuit area may include a first area and a second area extending from the first area. The first area may be thinner than the second area. The first area may have a rounded surface. The second area may include the vent and the vent may have grooves with at least one intersecting point In accordance with one or more other embodiments, a secondary battery includes a case; a terminal plate; an electrode assembly in the case; a cap plate connected to the case; and a short circuit area on or adjacent to the cap plate, wherein the short circuit area includes a conductive area, the conductive area to move from a first position to a second position under a first internal pressure in the case, the conductive area disconnected from the terminal plate in the first position and connected to the terminal plate in the second position to form a short circuit; a surrounding area surrounding the conductive area; and a vent on the conductive area or the surrounding area to open under a second internal pressure in the case different from the first internal pressure, the conductive area to move to the second position and the vent to open at different times.

The second internal pressure may be greater than the first internal pressure, and the vent may open after the conductive area moves to the second position. The conductive area may have a rounded surface. The conductive area may have a first concavity, and the surrounding area may have a second concavity which has a smaller depth than the first concavity. The vent may include grooves that cross each other. The vent may be provided on the conductive area which is thicker than the surrounding area.

The vent may be aligned with a discharge hole in the terminal plate, and the surrounding area may be offset relative to the discharge hole in the terminal plate. The vent may be provided on the surrounding area which is thicker than the conductive area. The vent may be aligned with a discharge hole in the terminal plate, and the conductive area may offset relative to the discharge hole in the terminal plate.

BRIEF DESCRIPTION OF THE DRAWINGS

Features will become apparent to those of skill in the art by describing in detail exemplary embodiments with reference to the attached drawings in which:

FIG. 5C illustrates a vent of the short circuit to rupture due to an internal pressure in a case.

DETAILED DESCRIPTION

Figure 1:
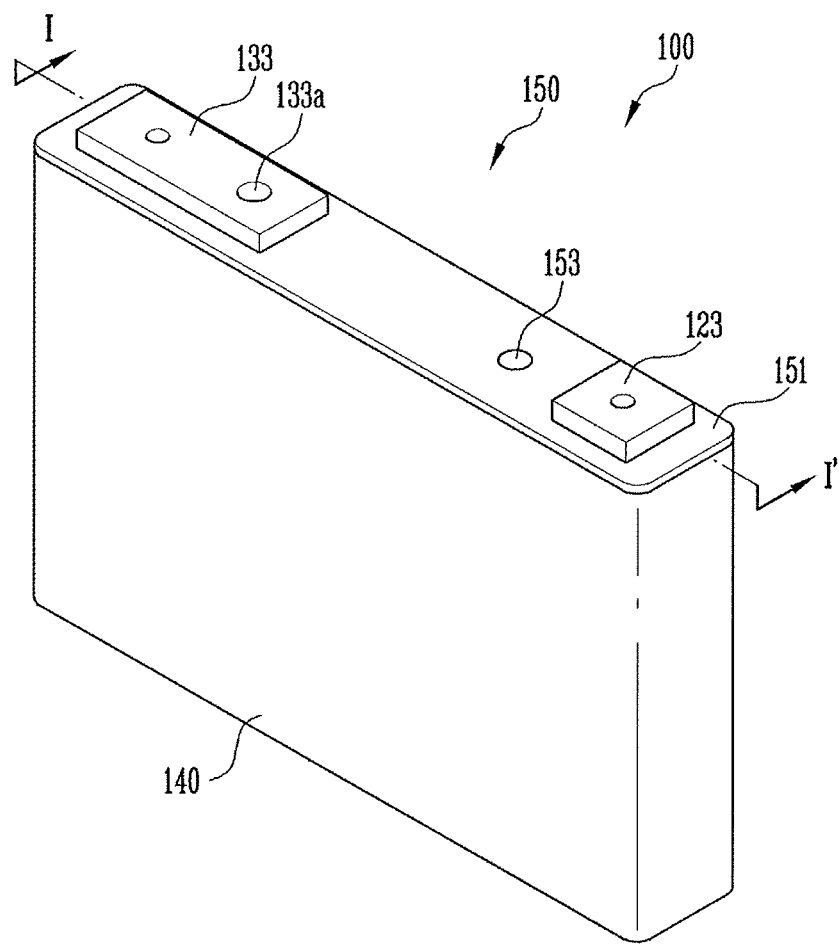
FIG. 1 illustrates an embodiment of a secondary battery.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In addition, it will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Figure 2:
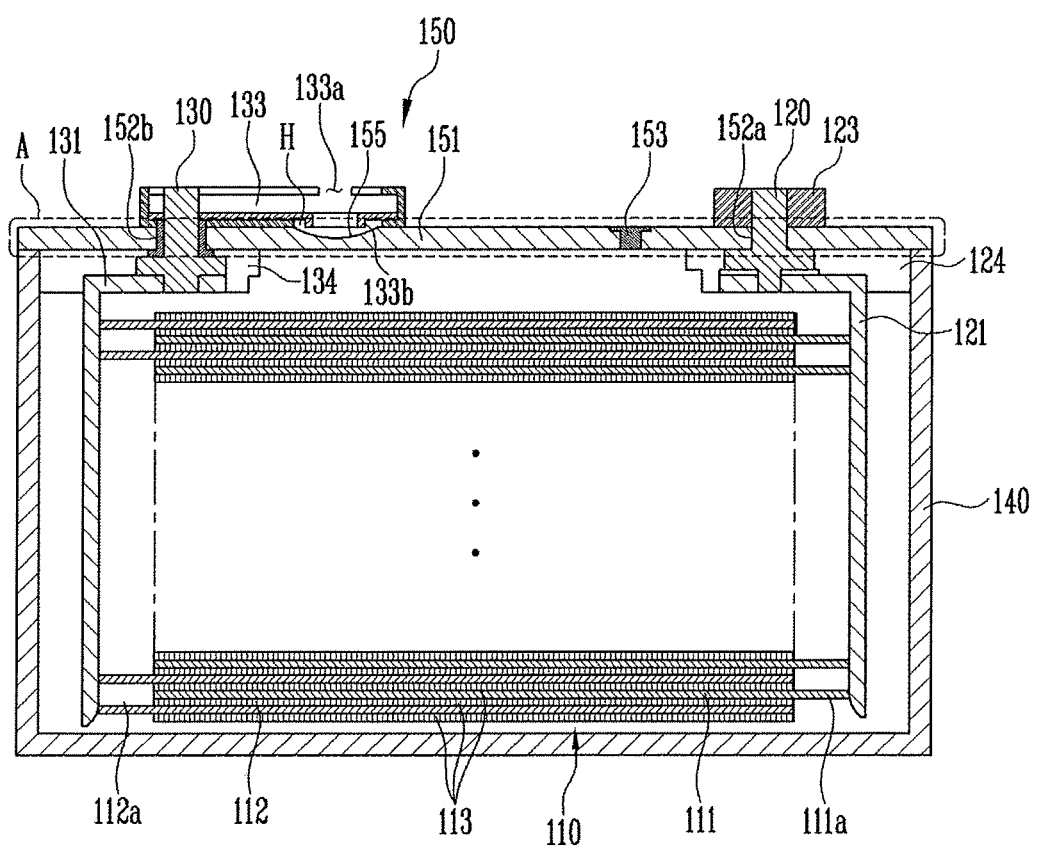
FIG. 2 illustrates a view taken along section line I-I' in FIG. 1.

FIG. 1 illustrates an embodiment of a secondary battery 100, and FIG. 2 is a cross-sectional view taken along I-I' in FIG. 1. As shown in FIGS. 1 and 2, the secondary battery 100 includes an electrode assembly 110, a case 140, and a cap plate 151. The electrode assembly 110 includes a separator 113 between a first plate 111 and a second plate 112. The case 140 receives the electrode assembly 110 and has an open surface. The cap plate 151 seals an opening of the case 140 and includes a hole H. A second terminal plate 133 is provided on an upper portion of the cap plate 151 and includes a discharge hole 133a corresponding to the hole H in the cap plate 151 and a protruding portion 133b. A short circuit portion or area 155 may be disposed at the hole H, and a vent portion 155c may be on an upper portion or a lower portion of the short circuit portion 155. The short circuit portion 155 may be sufficiently thin to flex or bend under internal pressure of the case 140 to break under the internal pressure in the case 140, to allow for both a short-circuit to form and venting as described herein.

Figure 3:
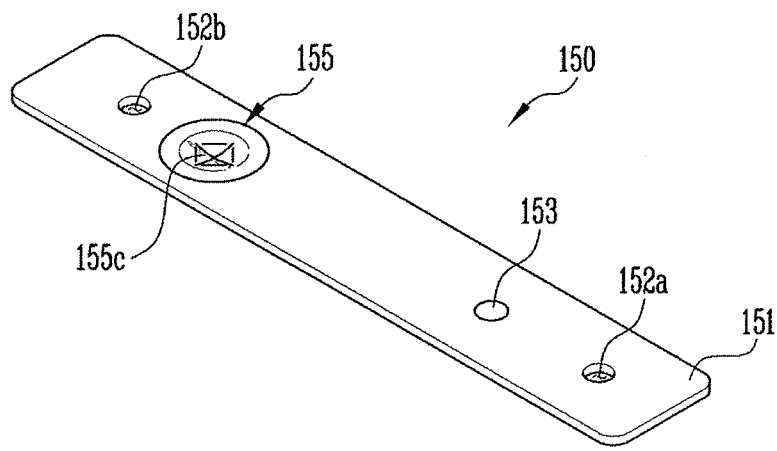
FIG. 3 illustrates an enlarged view of portion A in FIG. 2.

FIG. 3 illustrates an enlarged view of portion A including a cap assembly 150 in FIG. 2. In the cap assembly 150, the cap plate 151 may be made, for example, of aluminum and may have a surface at a prescribed angle to allow high current generated at the electrode assembly 110 to flow in a stable manner. The cap plate 151 overall may have a firm structure. The short circuit portion 155 in an area of the cap plate 151 may have a surface at a different (e.g., lower) angle than other areas of the cap plate 151.

For example, as shown in FIG. 3, the vent portion 155c may be formed in an area of an upper portion or a lower portion of the short circuit portion 155. The vent portion 155c may secure safety of the battery by discharging internal gas through a discharge hole 133a (FIG. 1) of the second terminal plate 133 if internal pressure of a battery increases, for example, due to overcharging. If the pressure inside the secondary battery becomes higher than a preset pressure, the short circuit portion 155 may be reversed due to the pressure. As a result, the short circuit portion 155 may come into contact with the second terminal plate 133 and induce a short circuit.

To achieve short circuiting in a stable manner, the second terminal plate 133 and the short circuit portion 155 of the cap plate 151 may have different polarities. For example, the second terminal plate 133 may be a cathode and the short circuit portion 155 may be an anode, or vice versa. The vent portion 155c may include at least one groove for easy opening under a predetermined pressure.

A vent portion 155c may be formed at a short circuit portion 155 in one area of the cap plate 151. If the pressure inside the battery increases, a short circuit may form. Thus, the flow of current may be blocked. Thereafter, the vent portion 155c may be fractured and internal gas may be discharged from the battery case.

The cap plate 151 may include an electrolyte injecting portion 153 for injecting an electrolyte solution into the case 140. The cap plate 151 may also include first and second terminal holes 152a and 152b into which first and second coupling terminals 120 and 130 may be inserted, respectively.

Referring again to FIG. 2, the electrode assembly 110 may be manufactured in a jelly roll form by winding the first and second plates 111 and 112 and the separator 113 together. The electrode assembly 110 may also be manufactured in a stack form by stacking a plurality of first and second plates 111 and 112 and the separator 113. Or, the electrode assembly 110 may be manufactured using both winding and stacking.

The first plate 111 may include of a first active material coating portion, formed by coating a first active material intermittently onto a first substrate. The first substrate may include a conductive material in sheet form. The first plate includes a first non-coated portion 111a, which is a portion where the first substrate is exposed since the first active material is not coated. The first non-coated portion 111a protrudes to a side of the first plate 111. The first plate 111 may include, for example, an anode plate and the second active material may include anode active material such as lithium, e.g., $LiCoO_2$, $LiNiO_2$, $LiMnO_2$, $LiMn_2O_4$ and $LiNi_{1-x-y}Co_xM_yO_2$.

The second plate 112 may have a different polarity from the first plate 111. The second plate 112 may include a second active material coating portion, formed by intermittently coating a second active material to a second substrate. The second substrate includes a conductive material in sheet form. The second plate 112 includes a second non-coated portion 112a, which is a portion where the second substrate is exposed because the second active material is not coated.

The second non-coated portion 112a may protrude on one side of the second plate 112. The second plate 112 may be, for example, a cathode plate and the first active material may be a cathode active material including a carbon material, e.g., crystalline carbon, amorphous carbon, carbon complex and carbon fiber and lithium metal or lithium alloy.

The separator 113 is between the first plate 111 and the second plate 112 and wound. The separator 113 provides insulation between the first plate 111 and the second plate 112. The separator 113 may control lithium ion exchange between the first plate 111 and the second plate 112. The separator 113 may have sufficient length to provide complete insulation between the first plate 111 and the second plate 112, even when the electrode assembly 110 contracts or expands.

The first or second substrate may include a metal formed as a thin film. For example, the first substrate may include aluminum and the second substrate may include copper. The first and second plates 111 and 112 may discharge ions to the electrolyte solution, causing a flow of current or electrons. The current or electrons may be transferred through the first and second non-coated portions 111a and 112a. The first non-coated portion 111a may be an anode and the second non-coated portion 112a may be a cathode.

The case 140 has a predetermined shape (e.g., a rectangular parallelepiped) with an open portion for receiving the electrode assembly 110 and the electrolyte solution. The opening may be sealed by the cap assembly 150. In another embodiment, the case 140 may have a different shape, e.g., a cylinder type, pouch type, or coin type.

The cap assembly 150 may include the cap plate 151 for sealing the opening of the case 140. First and second terminal plates 123 and 133 are located on an upper portion of the cap plate 151. The first and second terminal plates 123 and 133 may be electrically coupled to the first and second non-coated portions 111a and 112a, respectively, with the first and second coupling terminals 120 and 130 joining the first and second current collectors 121 and 131. In the first and second coupling terminals 120 and 130 and the cap plate 151, a sealing gasket for sealing insulating plates 124 and 134 may be included in the terminal holes 152a and 152b through which the first and second coupling terminals 120 and 130 pass.

Figure 4A:
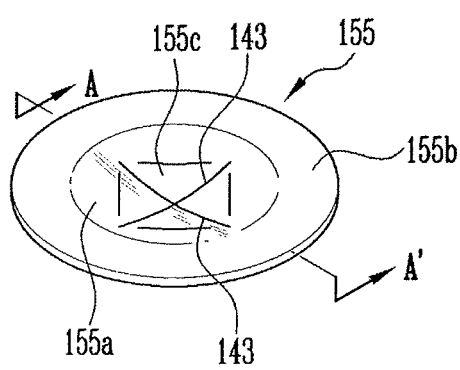
FIG. 4A illustrates an example of a short circuit according to one embodiment.
Figure 4B:
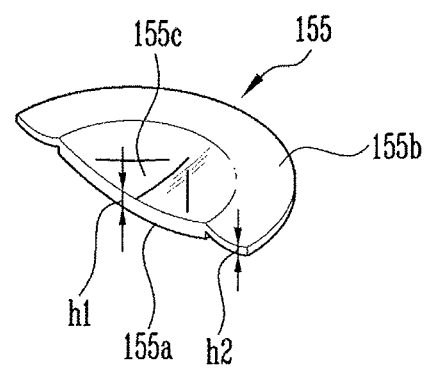
FIG. 4B illustrates a view along section line A-A' in FIG. 4A.
Figure 4C:
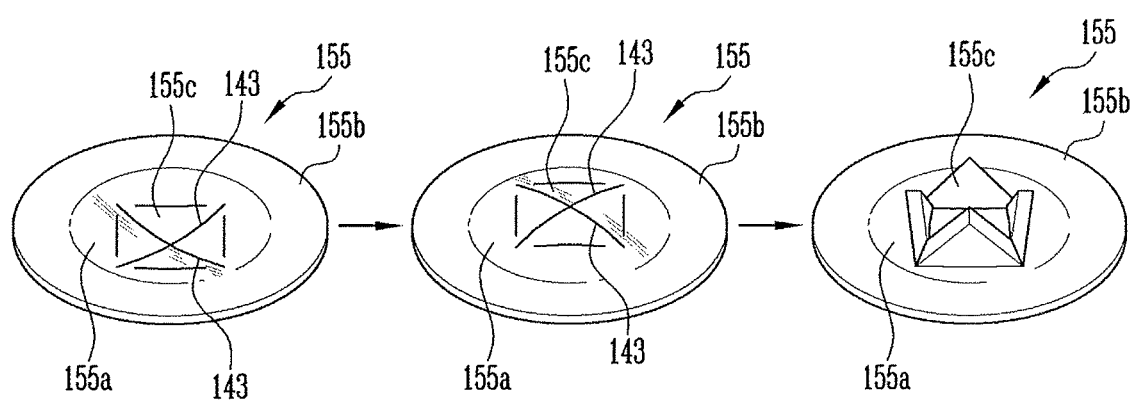
FIG. 4C illustrates a vent of the short circuit to rupture due to an internal pressure in a case.

FIG. 4A illustrates a short circuit portion according to one embodiment, FIG. 4B illustrates a cross-section view taken along A-A' in FIG. 4A, and FIG. 4C illustrates a vent of the short circuit to rupture due to an internal pressure in a case. As shown in FIGS. 4A and 4B, the short circuit portion 155 include a first area 155a located at a center of the short circuit portion 155 and a second area 155b extending from and surrounding the first area 155a. The first area 155a may have a first concavity and the second area 155b may have a second cavity different from the first concavity. The second concavity may be shallower than the first concavity.

The first and second areas 155a and 155b may move at different times under different pressures due to, for example, different thicknesses of these areas. For example, the second area 155b may move (e.g., change from a concave shape to a convex shape) under a lower pressure and thus sooner than the first area 155a. In another embodiment, the first and second areas may have the same concavity but may be made from different materials so that the second area 155b moves in a reverse direction sooner (e.g., under less pressure) than the first area 155a. In these or other embodiments, the first area 155a and the second area 155b may have different bend radii.

As shown in FIG. 4A, the first area 155a and the second area 155b may become more and more rounded (e.g., have more curvature or concavity) approaching a lower portion of the short circuit portion 155. The first area 155a includes the vent portion 155c at a point where grooves 143 cross each other. The vent portion 155c may be aligned with the discharge hole 133a of a second terminal plate 133, in order to allow internal gas to be easily discharged when internal pressure of the battery increases, for example, due to overcharging.

In FIG. 4A, the vent portion 155c has grooves 143 formed in X shape. In another embodiment, the grooves 143 may be arranged to have a different shape, provided the vent portion 155c is able to discharge internal gas under when a certain internal pressure develops.

As shown in FIG. 4B, in one embodiment, a thickness h1 of the first area 155a may be thicker than a thickness h2 of the second area 155b. As shown in FIG. 4C, if the first area 155a and/or the second area 155b may be reversed first. Thus, the first area 155a and/or the second area 155b may block the flow of current by contacting the protruding portion 133b of the second terminal plate 133. Thereafter, due to the pressure of the internal gas, the vent portion 155c formed in the first area 155a may be ruptured and the internal gas may be discharged from the battery through the vent portion 155c and the discharge hole 133a of the second terminal plate 133.

Since the first and second areas 155a and 155b are formed with different thicknesses, short circuit and rupture may occur at different points in time (the second area 155b may move to contact protruding portion 133b to create a short circuit under less pressure and before the first area 155a moves (ruptures) to allow internal gas to be released under a greater pressure later in time). As a result, safety of the battery may be improved.

Figure 5A:
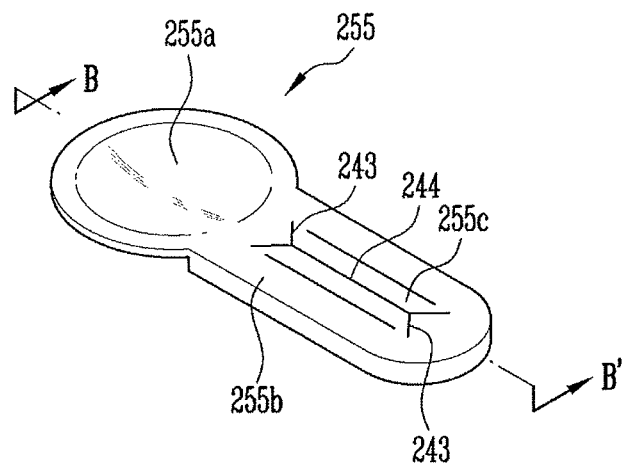
FIG. 5A illustrates a short circuit according to another embodiment.
Figure 5B:
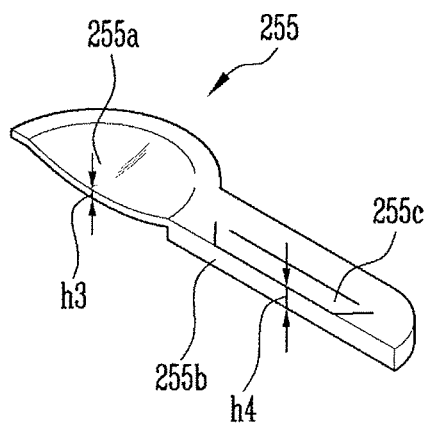
FIG. 5B illustrates a view along section line B-B' in FIG. 5A.

FIG. 5A illustrates a short circuit portion 255 according to another embodiment, FIG. 5B illustrates a cross-sectional view taken along section line B-B' in FIG. 5A, and FIG. 5C illustrates a vent of the short circuit to rupture due to an internal pressure in a case. As shown in FIGS. 5A and 5B, the short circuit portion or area 255 includes a third area 255a and a fourth area 255b extending from a side of the third area 255a. The third area 255a may be round in its lower portion. The fourth area 255b may include a vent portion 255c having at least two grooves 243 with at least one intersecting point or line 244. As shown in FIG. 5C, if internal pressure of the battery increases (e.g., due to overcharging), the vent portion 255c, which is aligned with the discharge hole 133a of the second terminal plate 133, may rupture to allow for easy discharge of internal gas. The vent portion 255c may have a different shape in another embodiment provided rupture can be accomplished at a predetermined internal pressure.

As shown in FIG. 5B, a thickness h3 of the third area 255a may be thinner than a thickness h4 of the fourth area 255b. If internal pressure in the battery increases, the third area 255a may be first reversed (e.g., move from a concave shape to convex shape) to block the flow of the current by contacting the second terminal plate 133. In this case, the third area 255a may be aligned with an internal surface of the terminal plate at a position that is not necessarily aligned with (e.g., may be adjacent to) the discharge hole 133a in the terminal plate and the vent portion 255c may be aligned with the discharge hole 133a in the terminal plate. In this case, the terminal plate may or may not have protruding portion 133b.

Thereafter, the internal gas may be discharged from the battery through the vent portion 255c and the discharge hole 133a of the second terminal plate 133. Since the third and fourth areas 255a and 255b are formed with different thicknesses, short circuit and rupture may occur at different points in time. Therefore, safety of the battery may be enhanced.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A secondary battery, comprising:
   an electrode assembly having a separator between first and second plates;
   a case including the electrode assembly and having an opening;
   a cap plate sealing the opening of the case and including a hole; and
   a terminal plate on the cap plate and including a discharge hole aligned with the hole in the cap plate, the hole including a short circuit area therein, the short circuit area having a vent,
   wherein:
   the short circuit area includes a second area surrounding and extending from a first area such that the second area contacts the cap plate, and
   the first area is thicker than an entirety of the second area.

2. The secondary battery as claimed in claim 1, wherein the first and second areas have rounded surfaces and different bend radii.

3. The secondary battery as claimed in claim 1, wherein the vent is in the first area and includes grooves that cross each other.

4. A secondary battery, comprising:
   a case;
   a terminal plate;
   an electrode assembly in the case;
   a cap plate connected to the case; and
   a short circuit area contacting the cap plate,
   wherein the short circuit area includes a conductive area, the conductive area to move from a first position to a second position under a first internal pressure in the case, the conductive area being disconnected from the terminal plate in the first position and connected to the terminal plate in the second position to form a short circuit; a surrounding area surrounding the conductive area and contacting the cap plate; and a vent on the conductive area or the surrounding area to open under a second internal pressure in the case different from the first internal pressure, the conductive area to move to the second position and the vent to open at different times, and wherein the vent is provided on a portion of the conductive area that is thicker than an entirety of the surrounding area.

5. The secondary battery as claimed in claim 4, wherein:
the second internal pressure is greater than the first internal pressure, and
the vent is to open after the conductive area moves to the second position.

6. The secondary battery as claimed in claim 4, wherein the conductive area has a rounded surface.

7. The secondary battery as claimed in claim 6, wherein;
the conductive area has a first concavity, and
the surrounding area has a second concavity which has a smaller depth than the first concavity.

8. The secondary battery as claimed in claim 4, wherein the vent includes grooves that cross each other.

9. The secondary battery as claimed in claim 4, wherein:
the vent is aligned with a discharge hole in the terminal plate, and
the surrounding area is offset relative to the discharge hole in the terminal plate.

* * * * *